United States Patent [19]
Denley

[11] Patent Number: 5,467,255
[45] Date of Patent: Nov. 14, 1995

[54] LEVEL INDICATING DEVICE FOR A VEHICLE HEADLAMP

[75] Inventor: Ronald S. Denley, Woodstock, Ill.

[73] Assignee: Elco Industries, Inc., Rockford, Ill.

[21] Appl. No.: 225,649

[22] Filed: Apr. 11, 1994

[51] Int. Cl.[6] .................................... B60Q 1/00
[52] U.S. Cl. ........................ 362/66; 362/80; 362/101; 33/288
[58] Field of Search ................. 362/61, 66, 80, 362/287, 418, 427, 101; 33/288, 372, 390, 384

[56] References Cited

U.S. PATENT DOCUMENTS

| | | | |
|---|---|---|---|
| 2,097,849 | 11/1937 | Torbert, Jr. | 33/388 |
| 2,557,291 | 6/1951 | Hubbard | 33/386 |
| 2,670,209 | 2/1954 | Fay | 33/372 |
| 2,940,174 | 6/1960 | Shoemaker | 33/335 |
| 3,612,854 | 10/1971 | Todd | 33/288 |
| 4,591,250 | 5/1986 | Woodruff | 33/379 |
| 4,802,067 | 1/1989 | Ryder et al. | 362/61 |
| 4,970,629 | 11/1990 | McMahan | 362/61 |
| 5,029,051 | 7/1991 | Shirai et al. | 362/66 |
| 5,031,081 | 7/1991 | Daumueller et al. | 361/66 |
| 5,055,980 | 10/1991 | Mochizuki | 362/66 |
| 5,083,244 | 1/1992 | Shirai et al. | 362/61 |
| 5,140,503 | 8/1992 | Lisak | 362/61 |
| 5,151,849 | 9/1992 | Nagengast et al. | 362/61 |
| 5,408,391 | 4/1995 | Denley | 33/288 |

Primary Examiner—Ira S. Lazarus
Assistant Examiner—Y. Quach
Attorney, Agent, or Firm—Leydig, Voit & Mayer, Ltd.

[57] ABSTRACT

The indicating device is adapted to be installed on a platform on a headlamp frame with a slip fit and, once installed, is automatically locked into place. The indicating device includes a bubble level having a vial which is molded integrally with a base adapted to be assembled with a spring metal retaining bracket with a slip fit. The retaining bracket includes cantilevered legs with free end portions which resiliently engage the upper side of the base to enable an adjusting screw to tilt the vial upwardly and downwardly to various positions relative to horizontal.

15 Claims, 4 Drawing Sheets

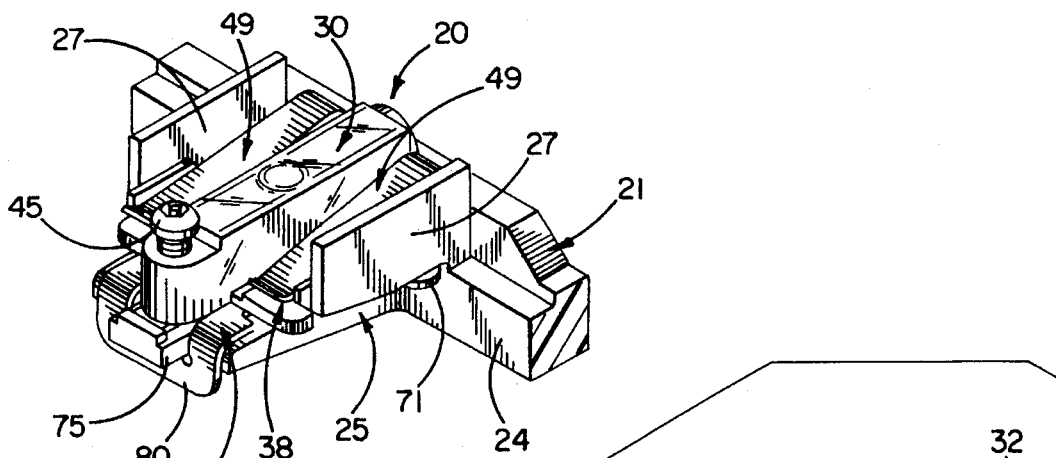
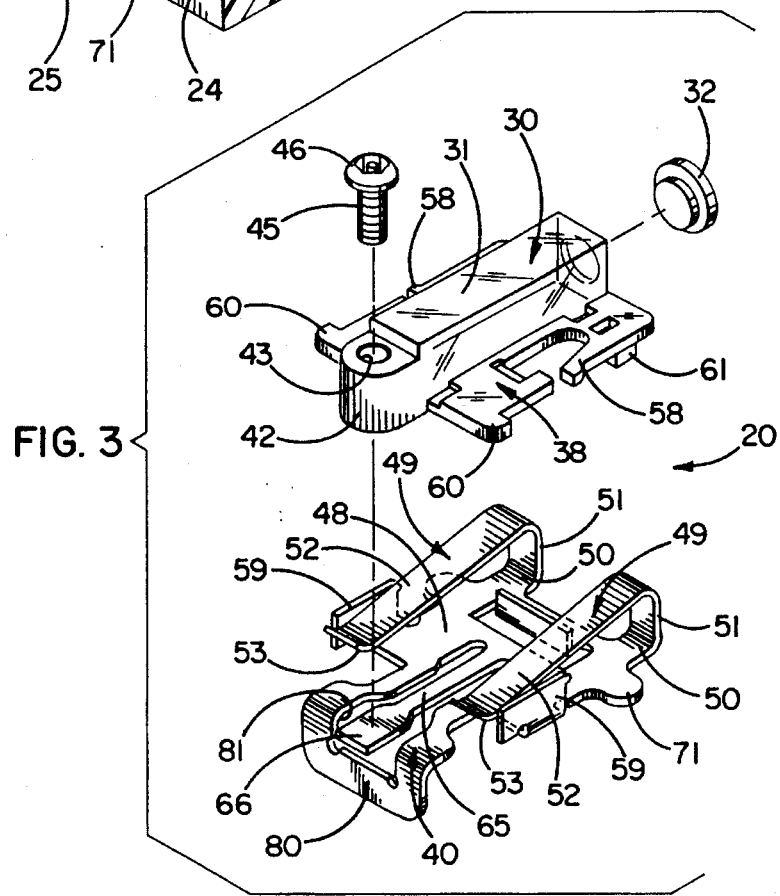
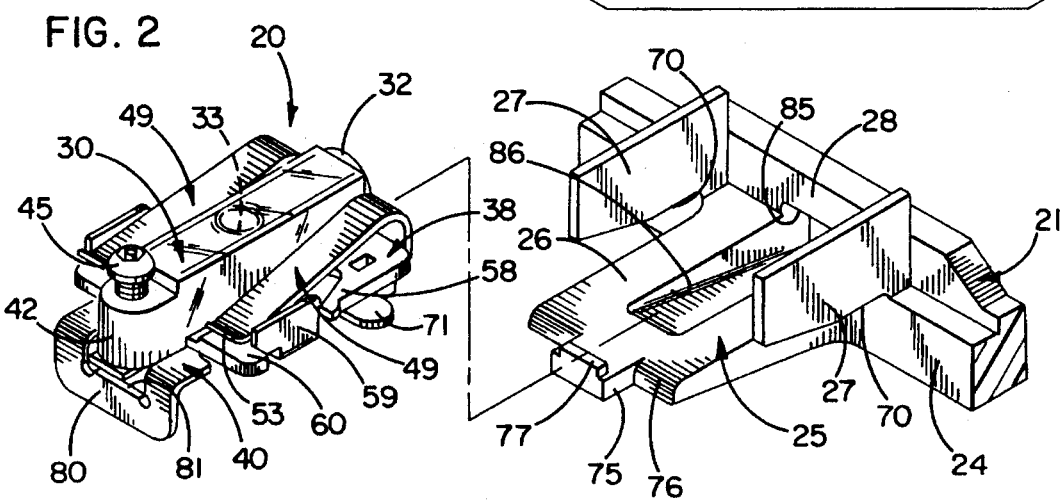

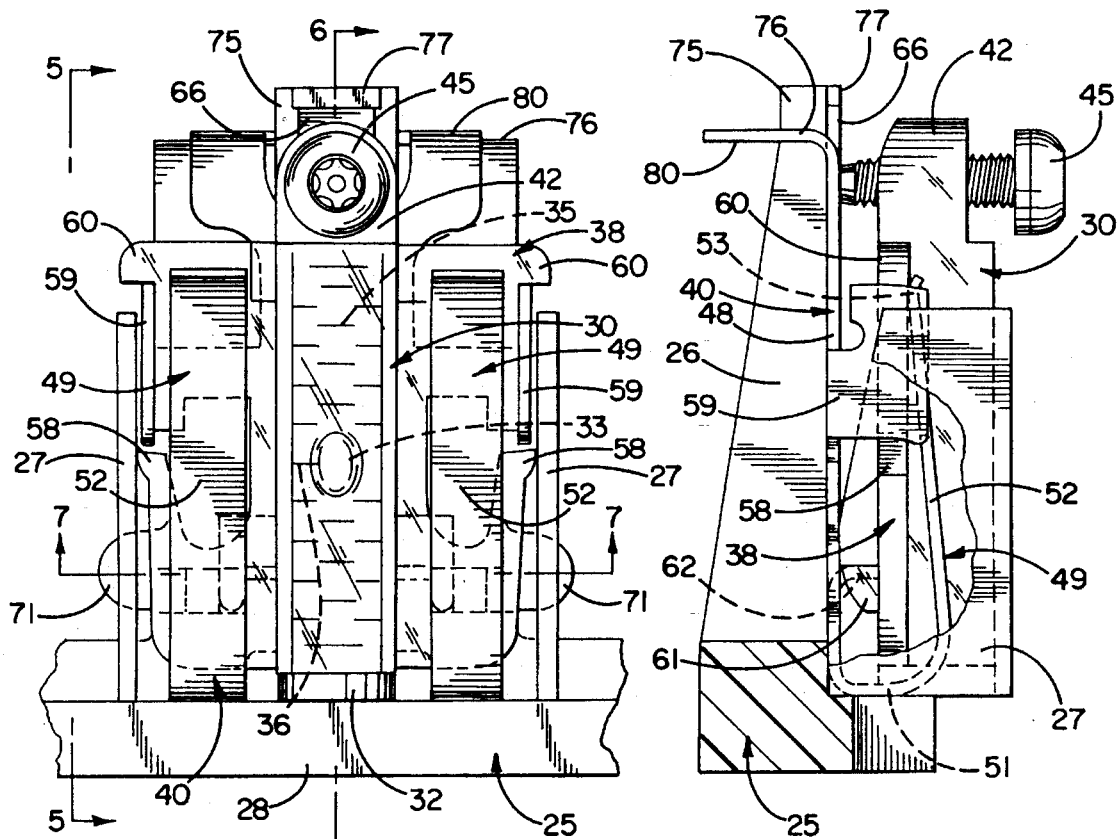
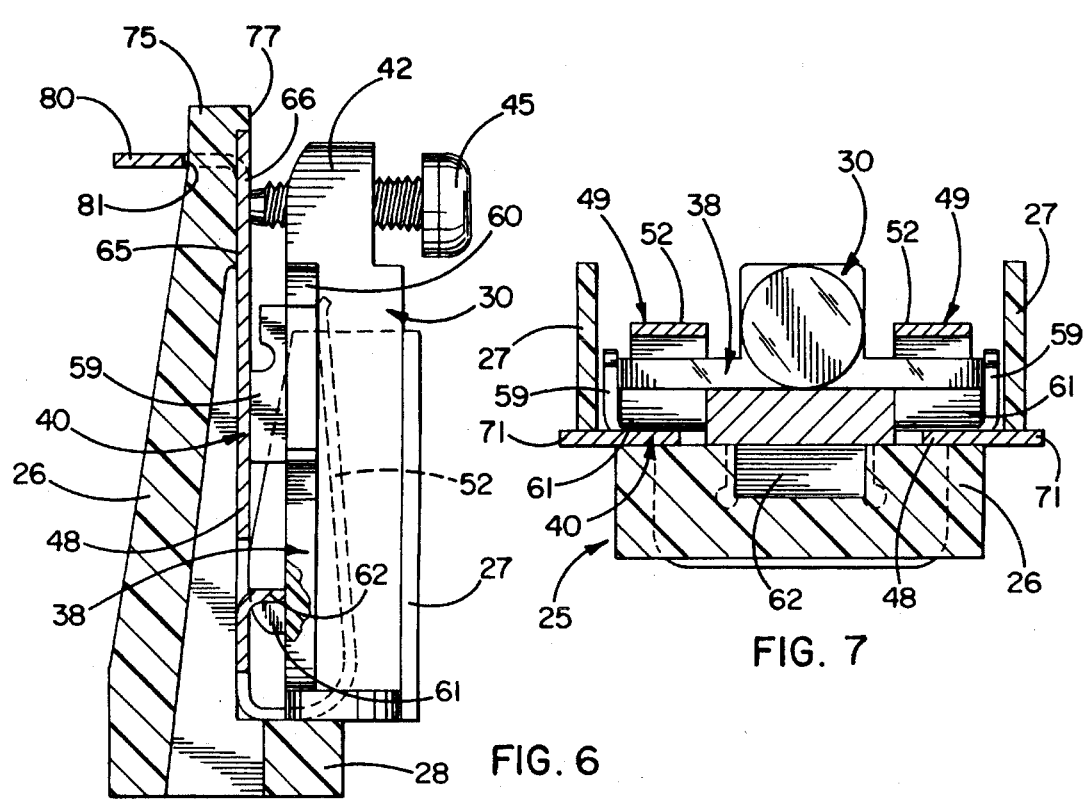

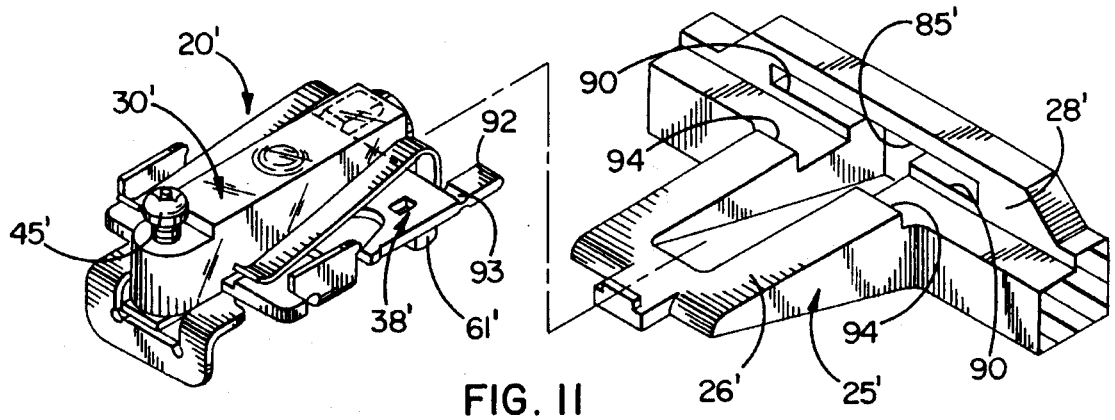
FIG. 11
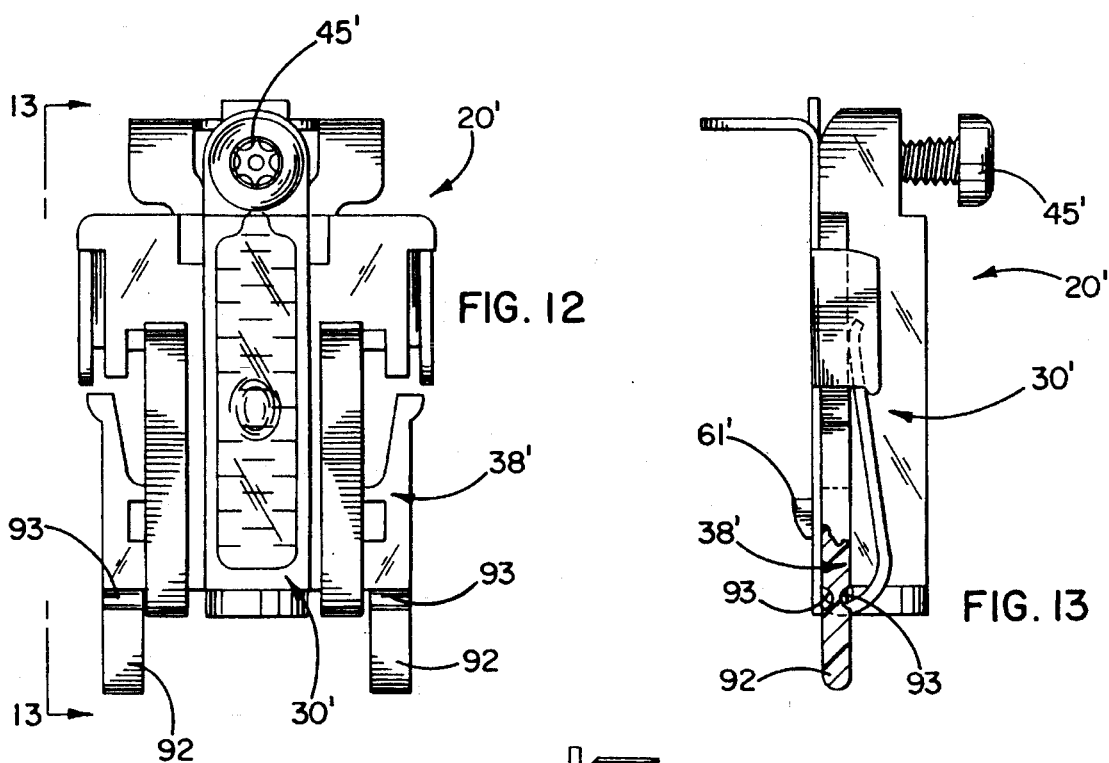
FIG. 12
FIG. 13
FIG. 14

LEVEL INDICATING DEVICE FOR A VEHICLE HEADLAMP

BACKGROUND OF THE INVENTION

This invention relates to a device for indicating the degree of tilt of a vehicle headlamp beam and, more specifically, to a device having a bubble level formed by a liquid-filled vial with a gas bubble therein that coacts with a graduated scale to indicate the degree of tilt of the vial from horizontal.

Such an indicating device typically is mounted on the frame or other component of the headlamp assembly. At the vehicle assembly plant, the frame is tilted about a horizontal axis to establish proper aim of the headlamp beam in a vertical direction. Once this is achieved, the inclination of the vial is adjusted in order to "zero" the bubble and establish the preset position of the headlamp. If the headlamp subsequently becomes improperly aimed, the indicating device may be used to determine when the lamp has been adjusted back to the preset position.

Commonly assigned Denley U.S. application Ser. No. 08/085,650, filed Jun. 30, 1993 discloses a comparatively small and low cost indicating device in which the vial is molded integrally with a base adapted to be assembled in a relatively simple manner with a spring metal retaining bracket by virtue of a slip fit between the base and the bracket. The device is installed with a slip fit into a molded housing or platform on the frame of the headlamp. When so installed, cantilevered legs of the bracket bear resiliently against laterally spaced upper walls of the housing to help retain the device in assembled relation with the housing. By virtue of resiliently engaging the upper walls of the housing, the legs enable the use of an adjusting screw for changing the inclination of the vial. Because the spring legs must resiliently engage the upper walls of the housing in order to enable adjustment of the vial, the device is more or less limited in use to a specific type of housing.

SUMMARY OF THE INVENTION

The general aim of the present invention is to provide a new and improved indicating device of the above general type which better lends itself to use with a wider variety of mounting housings or platforms.

A more specific object of the invention is to achieve the foregoing by providing an indicating device having a mounting bracket with spring legs which effectively coact with the adjusting screw without need of the legs resiliently engaging the mounting housing or platform.

In even a more detailed sense, the invention resides in the provision of an indicating device in which the spring legs are resiliently loaded by the plastic base of the vial in order to enable the adjusting screw to change the inclination of the vial.

These and other objects and advantages of the invention will become more apparent from the following detailed description when taken in conjunction with the accompanying drawings.

BRIEF DESCRIPTION OF THE DRAWINGS

FIG. 1 is a rear perspective view of a portion of a typical vehicle headlamp frame equipped with a new and improved indicating device incorporating the unique features of the present invention.

FIG. 2 is an exploded perspective view of the indicating device and frame portion shown in FIG. 2.

FIG. 3 is an exploded perspective view of the components of the indicating device.

FIG. 4 is an enlarged top plan view of the indicating device and the headlamp frame.

FIG. 5 is a side elevational view of the indicating device as seen along the line 5—5 of FIG. 4, portions of the headlamp frame being broken away and shown in section.

FIG. 6 is a cross-section taken substantially along the line 6—6 of FIG. 4.

FIG. 7 is a cross-section taken substantially along the line 7—7 of FIG. 4.

FIGS. 11 and 12 are views generally similar to FIGS. 2 and 4, respectively, but show the modified indicating device.

FIG. 13 is a side elevational view of the modified indicating device as seen along the line 13—13 of FIG. 12, portions of the indicating device being broken away and shown in section.

FIG. 14 is a view generally similar to FIG. 13 but shows still another indicating device.

Figure 8:
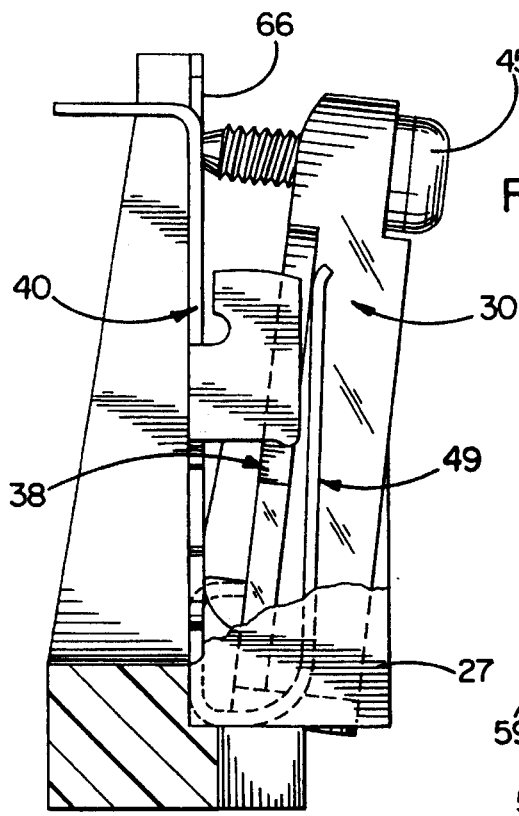
FIG. 8 is an enlarged view of certain components of the indicating device illustrated in FIG. 5 and shows such components in moved positions.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the invention has been shown in the drawings as incorporated in a level indicating device 20 which is associated with a frame 21 for holding a vehicle headlamp (not shown) and for mounting the headlamp on a vehicle body. As is conventional, the headlamp frame is supported on the body to pivot about a horizontal axis and is adapted to be pivoted about such axis by a manually operable adjusting device (not shown) which may, for example, be of the type disclosed in U.S. Pat. No. 5,193,905. During assembly of the vehicle, the frame is tilted as necessary to aim the headlamp properly in the vertical direction. Once the proper aim has been established, the indicating device is "zeroed" in order to establish the proper aim for future reference.

The present headlamp frame 21 is molded of plastic and includes an upper frame member 24 with a housing or platform 25. The platform 25 is shown most clearly in FIG. 2 and basically comprises a flat bottom wall 26, a pair of laterally spaced and upwardly projecting side walls 27, and an upwardly projecting forward wall 28. The various walls 26, 27 and 28 define a pocket within which a substantial portion of the indicating device 20 is located.

The present indicating device 20 includes a bubble level formed in part by a transparent vial 30 having a plastic body portion 31 with a generally rectangular external cross-sectional shape. The vial contains a viscous liquid which is sealed in the body portion of the vial by a generally circular cap 32 made of plastic and ultrasonically welded or otherwise suitably secured with a liquid-tight seal to the forward end of the body portion of the vial. A gas bubble 33 is entrapped in the liquid and, as is typical of bubble levels, moves toward that end of the vial that is tilted upwardly from horizontal. A graduated scale 35 (FIG. 4) underlies the transparent vial 30 and coacts with the vial to indicate the degree of tilt of the vial from horizontal. In this instance, the graduations of the scale 35 are printed on a strip of plastic or similar material which is glued in place by an optically clear adhesive. The graduations include a "zero" mark 36 indicating that the vial is level when the bubble is centered over such mark, and further include various other marks indicative of the degree that the vial is out of level in one direction or the other. The vial has a radius of curvature that lies in the vertical aiming plane of the headlamp beam. The apex of such curvature coincides with the "zero" mark, and the spacing of the graduations is related geometrically to the radius of curvature.

The vial 30 is molded integrally with a base 38 (FIG. 3). A retaining bracket 40 interfits with the base to hold the indicating device in the platform 25 and to facilitate calibration of the indicating device 20.

More specifically, the base 38 is molded as a unit with the vial 30 and is made of a hard but resilient plastic such as transparent nylon. The base includes a center portion immediately, underlying the vial and further includes wing portions projecting laterally from the sides of the vial adjacent the bottom thereof. A shallow pocket is molded in the underside of the center portion of the base to serve as a locator for the graduated scale 35.

The base 38 also is formed with a nose 42 (FIG. 3) located at the rear end of the vial 30 and just slightly smaller in height than the vial. A hole 43 is formed vertically through the nose and is adapted to receive the shank of an adjusting or calibrating screw 45 whose head 46 is formed with a tamper proof driving recess requiring a special tool for turning the screw. The screw preferably is of the thread-forming type and cuts threads in the plastic of the hole 43 as an incident to being initially driven into the hole.

The retaining bracket 40 (FIGS. 3 and 9) is made of a single piece of thin spring metal (e.g., spring steel) and includes a generally flat plate 48 which underlies the base 38. In accordance with the present invention, two laterally spaced legs 49 are formed integrally with the forward end of the plate 48. Each leg includes a generally horizontal forwardly extending section 50 (FIGS. 3 and 9) which projects forwardly beyond the forward end of the base 38; an upwardly extending section 51 projecting upwardly from the rear end of the forwardly extending section 50 in forwardly spaced relation with the base; and a rearwardly extending cantilevered upper section 52. In the preferred embodiment shown in FIGS. 1–9, each cantilevered section 52 is spaced above the base 38 adjacent the front thereof and slants downwardly toward the upper side of the base upon progressing rearwardly. The cantilevered sections straddle the vial 30.

Pursuant to the invention, each cantilevered section 52 includes a free end portion which bears resiliently downwardly against the upper side of the base 38 adjacent the rear end thereof. Herein, the free end portion of each cantilevered section engages the upper side of the base and then curves upwardly for a short distance as indicated at 53 in order to avoid digging into the base with a raw edge. Engagement of the free ends 53 of the legs 49 with the base holds the base and the bracket 40 in vertically assembled relation.

Assembly of the bracket 40 with the base 38 is effected by sliding the bracket rearwardly with respect to the base. As the bracket 40 is slid rearwardly relative to the base 38, means automatically interlock with one another to prevent return forward movement of the bracket with respect to the base. Herein, these means comprise two laterally spaced and cantilevered latching fingers 58 (FIG. 3) formed integrally with the side edge portions of the base about midway between its ends and capable of flexing laterally inwardly relative to the base 38 and vial 30. As the bracket 40 is slid rearwardly relative to the base 38, the rear edges of lugs 59 which are bent upwardly from the side edges of the plate 48 engage the fingers 58 and cam the fingers inwardly. Once the forward edges of the lugs move rearwardly past the fingers, the latter spring outwardly and thereafter engage the forward edges of the lugs to prevent forward movement of the bracket relative to the base. Ears 60 (FIG. 4) are formed integrally with and project laterally from the base adjacent the rear end thereof. Engagement of the rear edges of the lugs 59 with the ears 60 limits the extent to which the bracket may move rearwardly relative to the base. The lugs also limit lateral movement of the rear end portion of the base relative to the bracket. Lateral movement of the forward end portion of the base relative to the bracket is limited by virtue of ears 61 (FIGS. 6 and 7) formed integrally with and projecting downwardly from the side edges of the base straddling a tab 62 which is struck upwardly from the plate 48 adjacent the forward end thereof. The upper edge of the tab 62 defines a fulcrum which engages the lower side of the base 38 near the forward end of the base and which supports the base for pivoting relative to the bracket 40 about a laterally extending axis.

Figure 9:
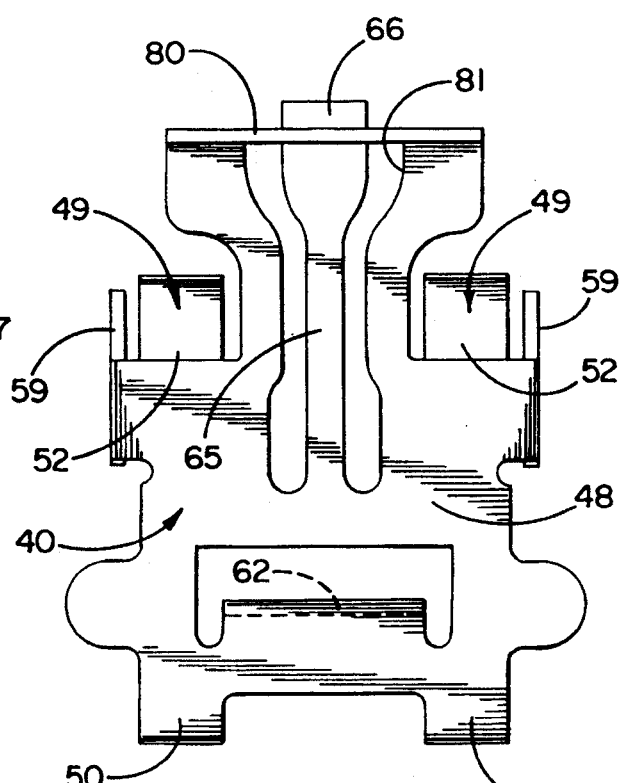
FIG. 9 is a bottom plan view of the retaining bracket of the indicating device.
Figure 10:
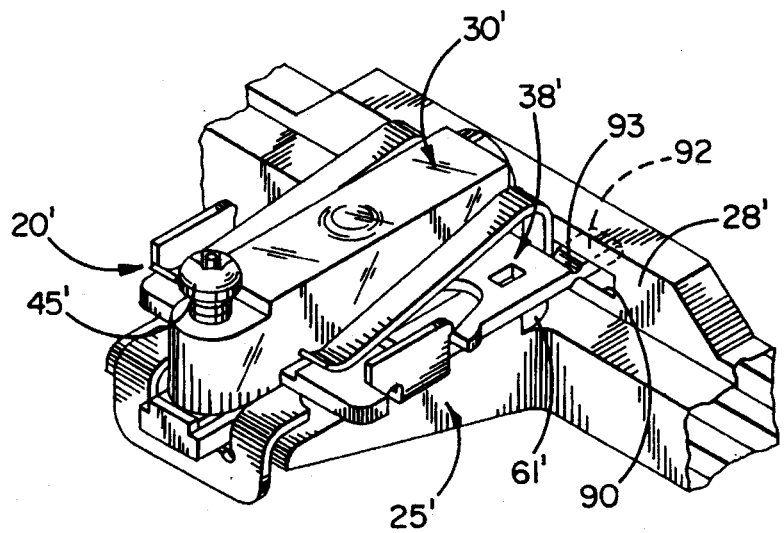
FIG. 10 is a view generally similar to FIG. 1 but is a front perspective showing a modified indicating device in connection with a different type of headlamp frame.

As shown in FIGS. 3 and 9, an elongated tang 65 is formed integrally with and projects rearwardly from the plate 48 of the bracket 40 and includes a laterally enlarged pad 66 which underlies the lower end of the shank of the screw 45. When the device 20 is in an installed position in the platform 25, the pad 66 prevents the end of the metal screw from digging into and forming a depression in the bottom wall 26 of the platform.

The indicating device 20 is adapted to be installed simply by slipping the device forwardly onto the platform 25. As shown most clearly in FIG. 2, the side walls 27 of the platform are spaced laterally outboard from the bottom wall 26 and include lower edges 70 which are spaced above the bottom wall. When the device 20 is slid forwardly, laterally projecting ears 71 formed integrally with the forward end portion of the plate 48 move beneath the lower edges 70 of the side walls 27. Engagement of the ears 71 with the lower edges 70 prevents the forward end portion of the bracket 40 from moving upwardly relative to the platform 25.

Novel means are provided for preventing the rear end of the bracket 40 from shifting upwardly relative to the platform 25 and for preventing the bracket from shifting forwardly, rearwardly, and upwardly relative to the platform once the device 20 has been installed on the platform. Herein, these means are formed in part by a rearwardly projecting tongue 75 (FIG. 2) molded integrally with the rear end 76 of the bottom wall 26 of the platform 25. An upstanding ledge 77 is molded integrally with the rear end portion of the tongue and defines a forwardly facing shoulder which is spaced forwardly from the rear end of the tongue.

Coacting with the tongue 75 is a tab 80 which is bent downwardly from the rear end of the plate 48 of the bracket 40. An opening 81 is formed through the tab 80 and the adjacent end portion of the plate 48 to accommodate the tongue, the edges of the opening engaging the tongue to prevent upward and lateral shifting of the plate relative to the platform 25. The pad 66 of the tang 65 projects rearwardly through the opening 81.

As the indicating device 20 is slid forwardly along the platform 25, the tab 80 moves into telescoping relation with the tongue 75. As forward movement continues, the tang 65 and the pad 66 are cammed upwardly by the ledge 77 against the force of the cantilevered sections 52, which bear against the base 38 and through the screw 45 onto the pad 66. At about the same time that the tab 80 engages the rear end 76 of the platform 25, the pad 66 clears the ledge 77 and springs downwardly in front of the forwardly facing shoulder defined by the ledge. In the finally installed position of the device 20, the lower edge of the opening 81 in the tab 80 engages the lower side of the tongue 75 to prevent upward movement of the rear portion of the bracket 40, the forward side of the tab 80 engages the rear end 76 of the bottom wall 26 of the platform to prevent forward shifting of the bracket, and the rear edge of the pad 66 engages the forwardly facing shoulder of the ledge 77 to prevent rearward shifting of the bracket. If it is necessary to remove the device 20 from the platform 25, a blade-like tool (not shown) may be inserted through a hole 85 (FIG. 2) in the forward wall 28 of the platform and may be used to pry the pad 66 of the tang 65 upwardly out of engagement with the ledge 77 to permit rearward shifting of the device. A groove 86 in the bottom wall 26 accommodates the tool during the prying operation.

When the device 20 is installed on the platform 25, adjustment of the inclination of the vial 30 may be effected by turning the screw 45. If the screw is turned in a tightening direction, it bears downwardly against the pad 66 which, in turn, bears downwardly against the bottom wall 26 of the platform 25. This forces the rear end portion of the vial 30 and the integral base 38 to pivot upwardly about the fulcrum defined by the upper edge of the tab 62 and enables the air bubble 33 to shift from front-to-rear in the vial in order to bring the bubble to the zero position. During upward pivoting of the rear end portion of the vial, the cantilevered sections 52 of the spring legs 49 of the bracket 40 are resiliently loaded by virtue of the base 38 forcing upwardly against the free end portions 53 of the legs.

When the screw 45 is turned in a loosening direction, the resiliently loaded cantilevered sections 52 of the legs 49 cause the rear end portion of the vial 30 to pivot downwardly about the fulcrum 62. Thus, loosening of the screw causes rear-to-front movement of the bubble 33 for purposes of zeroing the bubble.

From the foregoing, it will be apparent that the present invention brings to the art a headlamp indicating device 20 in which the vial 30 and the integral base 38 may be slipped into assembled relation with the spring bracket 40 and in which the assembled device may be slipped into an installed position on the platform 25. Since the spring legs 49 are resiliently loaded by upward pivoting of the rear end of the base 38 and since the tongue 75 serves as the reaction point during such resilient loading, the top of the platform 25 may be virtually of any configuration. The top of the platform may, for example, be completely open as illustrated or, if desired, the top may be closed by a longitudinally slotted cover (not shown) whose only function is to protect major portions of the indicating device. If such a cover is employed, the top of the vial 30 is visible through the longitudinal slot in the cover, the use of the cover being made possible by virtue of the cantilevered sections 52 of the legs 49 slanting downwardly upon progressing forwardly so as to provide space for the cover.

A modified indicating device 20' for use with a modified platform 25" is shown in FIGS. 11–13 in which parts corresponding to those of the first embodiment are indicated by the same but primed reference numerals. The modified platform lacks upstanding side walls corresponding to the side walls 27 and its front wall 28' is formed with laterally extending slots 90 on opposite sides of the hole 85'.

The modified indicating device 20' lacks a tab or fulcrum corresponding to the tab 62 and also lacks ears corresponding to the ears 71. In place of the tab and ears, the device 20' includes a pair of laterally spaced tabs 92 molded integrally with and projecting forwardly from the base 38'. When the device 20' is assembled with the platform 25', the tabs 92 slip into the slots 90 and prevent upward bodily movement of the forward end of the device. To enable pivoting of the vial 30' during adjustment of the screw 45', laterally extending grooves 93 are formed between the tabs 92 and the adjacent ends of the base and define living hinges which permit upward and downward pivoting of the base relative to the tabs. Upon installation of the device 20', the ears 61' drop into engagement with forwardly facing shoulders 94 (FIG. 11) at the forward end of the bottom wall 26' of the platform 25'. When the screw is adjusted, the upper ends of the shoulders 94 serve as a fulcrum.

The indicating device 20" shown in FIG. 14 is similar to that of FIGS. 10–13 except that the device 20" includes a somewhat different retaining bracket 40". The cantilevered sections 52" of the legs 49" of the bracket 40" extend generally parallel to the upper side of the base 38" rather than sloping downwardly toward the base. The free end of each cantilevered section 52" is defined by a downwardly extending portion 95 and by a forwardly extending portion 96, the latter bearing resiliently downwardly against the upper side of the base 38". The bracket 40" has a higher vertical profile than the brackets 40 and 40' and may be used in applications where sufficient vertical space is available to accommodate the cantilevered sections 52".

I claim:

1. An indicating device for a vehicle headlamp, said device comprising a base molded of resilient plastic and having first and second ends, having first and second laterally spaced side edge portions and having upper and lower sides, a transparent vial having a body portion molded integrally with and projecting upwardly from the upper side of said base between the side edge portions thereof, said vial containing liquid having a gas bubble therein, means associated with said vial and coacting with said bubble to indicate when said vial is horizontal, a retaining bracket made of a single piece of spring metal, connecting means on said base and said bracket and interfitting with one another to hold said base and said bracket in assembled relation, said bracket having a plate underlying said base and having a pair of laterally spaced legs formed integrally with said plate, said legs having first generally horizontal sections projecting in one direction outwardly and away from said first end of said base, having second sections integral with and extending upwardly from said first sections in opposing relation with said first end of said base, and having cantilevered sections integral with said second sections and extending generally toward said second end of said base and generally opposite of said first sections, said cantilevered sections being located on opposite sides of said vial in straddling relation with said vial and having at least portions spaced above the upper side of said base in overlying relation therewith, said cantilevered sections having free ends bearing resiliently downwardly against the upper side of said base adjacent the second end of said base and said free ends of said cantilevered sections resisting upward movement of the second end of said base relative to said bracket.

2. An indicating device as defined in claim 1 in which said cantilevered sections slant downwardly toward the upper side of said base upon progressing from said first end of said base toward said second end of said base.

3. An indicating device as defined in claim 2 in which the free ends of said cantilevered sections engage the upper side of said base and then curve upwardly thereof.

4. An indicating device as defined in claim 1 in which said cantilevered sections extend generally parallel to the upper side of said base, said free ends having first portions extending downwardly from said cantilevered sections and having second portions extending generally horizontally from said first portions and toward said first end of said base.

5. An indicating device as defined in claim 1 further including a threaded hole extending substantially vertically through an end portion of said base adjacent said second end thereof, an adjusting screw threaded through said hole and having a lower end engageable with said plate, a fulcrum located between said plate and said base and supporting said base to pivot relative to said plate about a laterally extending axis, said screw causing said base to tilt in one direction about said axis when said screw is turned in one direction, and the free ends of said cantilevered sections causing said base to tilt oppositely about said fulcrum when said screw is turned in the other direction.

6. An indicating device as defined in claim 5 in which said fulcrum is defined by a tab struck upwardly from said plate and engaging the lower side of said base.

7. An indicating device as defined in claim 1 in which said plate includes first and second side edge portions located adjacent the first and second side edge portions, respectively, of said base, said connecting means comprising lugs extending upwardly from the side edge portions of said plate, and means on the side edge portions of said base and engageable with said lugs to prevent said bracket from moving toward the second end of said base.

8. An indicating device as defined in claim 7 in which said connecting means further include cantilevered latching fingers integral with the side edge portions of said base, said latching fingers being adapted to be squeezed laterally inwardly toward said vial and adapted to spring laterally outwardly away from said vial by virtue of the resiliency of the plastic of the base, said latching fingers being engageable with said lugs to prevent said bracket from moving toward the first end of said base.

9. An indicating device as defined in claim 5 in which said connecting means include means integral with said base and engageable with said fulcrum to prevent lateral movement of said bracket relative to said base.

10. An indicating device as defined in claim 1 further including a tab integral with and extending downwardly from said plate adjacent the second end of said base, there being an opening formed through said tab and said plate adjacent the second end of said base, and a cantilevered tang formed integrally with said plate, said tang projecting outwardly through said opening in said tab and away from said second end of said base.

11. An indicating device as defined in claim 1 further including a pair of laterally spaced and generally horizontal tabs formed integrally with and projecting from said first end of said base, and living hinges between said tabs and said base and permitting said base to pivot relative to said tabs about a laterally extending axis.

12. An indicating device as defined in claim 1 in combination with a vehicle headlamp component, said component comprising a platform having a bottom wall, laterally spaced side walls and first and second ends, a tongue having free end projecting generally horizontally from the second end of said platform, a shoulder extending upwardly from said tongue and spaced generally horizontally inwardly from the free end thereof, a tab integral with and extending downwardly from said plate and engageable with the second end of said platform to prevent said plate from shifting toward the first end of said platform, an opening formed through said tab and said plate the adjacent the second end of said platform and accommodating said tongue, and a cantilevered tang formed integrally with said plate, said tang projecting into said opening and into engagement with said shoulder to prevent said plate from shifting toward the second end of said platform.

13. An indicating device as defined in claim 12 wherein said opening has bottom and opposite side edges and wherein the edges of said opening engage said tongue to prevent said plate from shifting upwardly and laterally relative to said platform.

14. An indicating device as defined in claim 12 further including a wall projecting upwardly from said platform adjacent the first end thereof, a pair of laterally spaced slots formed in said wall, a pair of laterally spaced tabs formed integrally with said base and projecting into said slots to captivate said base against upward bodily shifting relative to said platform, and living hinges between said tabs and said base and permitting said base to pivot relative to said platform about a laterally extending axis.

15. An indicating device as defined in claim 14 further including a threaded hole extending substantially vertically through an end portion of said base adjacent said second end thereof, an adjusting screw threaded through said hole and having a lower end engageable with said plate, said screw causing said base to tilt in one direction about said axis when said screw is turned in one direction, and the free ends of said cantilevered sections causing said base to tilt oppositely about said axis when said screw is turned in the other direction.

* * * * *